US007888634B2

(12) United States Patent
Guna et al.

(10) Patent No.: US 7,888,634 B2
(45) Date of Patent: Feb. 15, 2011

(54) METHOD OF OPERATING A LINEAR ION TRAP TO PROVIDE LOW PRESSURE SHORT TIME HIGH AMPLITUDE EXCITATION

(75) Inventors: Mircea Guna, Toronto (CA); Yves Le Blanc, Newmarket (CA)

(73) Assignee: DH Technologies Development Pte. Ltd., Singapore (SG)

( * ) Notice: Subject to any disclaimer, the term of this patent is extended or adjusted under 35 U.S.C. 154(b) by 203 days.

(21) Appl. No.: 12/359,471

(22) Filed: Jan. 26, 2009

(65) Prior Publication Data

US 2009/0194683 A1 Aug. 6, 2009

Related U.S. Application Data

(60) Provisional application No. 61/025,037, filed on Jan. 31, 2008.

(51) Int. Cl.
*B01D 59/44* (2006.01)
*H01J 49/00* (2006.01)

(52) U.S. Cl. ........................ 250/282; 250/281; 250/284; 250/288; 250/290; 250/292; 250/423 R; 250/423 P

(58) Field of Classification Search ................. 250/282, 250/281, 284, 288, 290, 292, 423 R, 423 P
See application file for complete search history.

(56) References Cited

U.S. PATENT DOCUMENTS 6,787,760 B2 * 9/2004 Belov et al. ................. 250/282
6,833,544 B1 * 12/2004 Campbell et al. ........... 250/282
6,949,743 B1 * 9/2005 Schwartz .................... 250/290
2006/0054808 A1 3/2006 Schwartz
2006/0163470 A1 7/2006 Doroshenko et al.
2009/0194684 A1 * 8/2009 Guna et al. ................. 250/282

OTHER PUBLICATIONS

PCT/CA2009/000087: International Search Report and Written Opinion.

* cited by examiner

*Primary Examiner*—Jack I Berman
*Assistant Examiner*—Meenakshi S Sahu
(74) *Attorney, Agent, or Firm*—Bereskin & Parr LLP/S.E.N.C.R.L., s.r.l.

(57) ABSTRACT

In accordance with an aspect of an embodiment of the present invention, there is provided a method for fragmenting ions in an ion trap of a mass spectrometer. The method comprises a) selecting parent ions for fragmentation; b) retaining the parent ions within the ion trap for a retention time interval, the ion trap having an operating pressure of less than about 1x10−4 Torr; c) providing a RF trapping voltage to the ion trap to provide a Mathieu stability parameter q at an excitement level during an excitement time interval within the retention time interval; d) providing a resonant excitation voltage to the ion trap during the excitement time interval to excite and fragment the parent ions; and, e) within the retention time interval and after the excitement time interval, terminating the resonant excitation voltage and changing the RF trapping voltage applied to the ion trap to reduce the Mathieu stability parameter q to a hold level less than the excitement level to retain fragments of the parent ions within the ion trap.

18 Claims, 7 Drawing Sheets

METHOD OF OPERATING A LINEAR ION TRAP TO PROVIDE LOW PRESSURE SHORT TIME HIGH AMPLITUDE EXCITATION

This is a non-provisional application of U.S. application No. 61/025,037 filed Jan. 31, 2008. The contents of U.S. application No. 61/025,037 are incorporated herein by reference.

FIELD

The invention relates generally to a method of operating a linear ion trap mass spectrometer.

INTRODUCTION

Ion traps are scientific instruments useful for the study and analysis of molecules. These instruments contain multiple electrodes surrounding a small region of space in which ions are confined. Oscillating electric fields and static electric fields are applied to the electrodes to create a trapping potential. Ions that move into this trapping potential become "trapped"—that is, restricted in motion to the ion-confinement region.

During their retention in the trap, a collection of ionized molecules may be subjected to various operations (such as, for example without limitation, fragmentation or filtering). The ions can then be transmitted from the trap into a mass spectrometer, where a mass spectrum of the collection of ions can be obtained. The spectrum reveals information about the composition of the ions. Following this procedure the chemical makeup of an unknown sample can be discerned, providing useful information for the fields of medicine, chemistry, security, criminology, and others.

SUMMARY

Ion fragmentation is a process that breaks apart, or dissociates, an ion into some or all of its constituent parts. Commonly, this is carried out in an ion trap by applying an alternating electric potential (RF potential) to electrodes of the trap to impart kinetic energy to the ions in the trap. The accelerated ions can collide with other molecules within the trap, resulting, for sufficiently high collision energies, in fragmentation of the ions. However, not all RF potentials result in fragmentation of the ions. Some RF potentials due, for example, to the RF frequency, amplitude or both, place ions on trajectories such that the ions collide with elements of the ion trap, or are ejected from the trap. Other oscillatory motions may not be of sufficient amplitude, and thus may impart insufficient energy to fragment the ions. In some of these low-amplitude, low-energy cases, the ions may even lose energy during a collision. In addition, much of the art indicates that high collision gas pressures, e.g. in the $10^{-3}$ Torr and greater range, and/or high excitation amplitudes, e.g. in the 600 mV (ground to peak) and greater range, are necessary to achieve high fragmentation efficiency.

In various embodiments, methods for operating an ion trap are provided that produce fragment ions using lower collision gas pressures and lower RF excitation amplitudes than used in traditional methods. In various embodiments, methods are provided that use lower collision gas pressures, lower RF excitation amplitudes and longer excitation times than in traditional methods. In various embodiments, methods are provided for use with a linear ion trap comprising a RF multipole where the rods (radial confinement electrodes) of the multipole have substantially circular cross-sections.

In various aspects, the present teachings provide methods for fragmenting ions in a linear ion trap at pressures less than about $1\times10^{-4}$ Torr and with excitation amplitudes of between 50 millivolts (mV) and about 250 millivolts (mV) (zero to peak). In various embodiments, methods are provided for fragmenting ions in a linear ion trap at pressures less than about $1\times10^{-4}$ Torr, with excitation amplitudes of less than about 250 millivolts (mV) (zero to peak) at fragmentation efficiencies of greater than about 80% for ion excitation times of less than about 25 ms. In still further embodiments, methods are provided for fragmenting ions in a linear ion trap at excitation amplitudes of up to about 700 millivolts (mV) (zero to peak) during an ion excitation time of about 10 ms.

In various embodiments, the ion trap comprises a quadrupole linear ion trap, having rods (radial electrodes) with substantially circular cross-sections that can produce ion-trapping fields having nonlinear retarding potentials. In various embodiments, the substantially circular cross-section electrodes facilitate reducing losses of ions due to collisions with the electrodes through a dephasing of the trapping RF field and the ion motion.

In various embodiments, the amplitude of the auxiliary alternating potential, or resonant excitation voltage amplitude, is one or more of: (a) less than about 250 mV (zero to peak); (b) less than about 125 mV (zero to peak); (c) in the range between about 50 mV (zero to peak) to about 250 mV (zero to peak); and/or (d) in the range between about 50 mV (zero to peak) to about 125 mV (zero to peak). In various embodiments, the auxiliary alternating potential is applied for an excitation time that is one or more of: (a) greater than about 10 milliseconds (ms); (b) greater than about 20 ms; (a) greater than about 30 ms; (c) in the range between about 2 ms and about 50 ms; and/or, (d) in the range between about 1 ms and about 150 ms. The duration of application of the auxiliary alternating potential can be chosen to substantially coincide with the delivery of the neutral gas.

In various embodiments, the amplitude of the auxiliary alternating potential and the excitation time interval can be selected to be in a pre-desired range corresponding to a particular mass range, and/or mass ranges, of ions to be excited. For example, the excitation amplitude can be: in a range between about 50 $\text{millivolts}_{(0\text{-}pk)}$ to about 300 $\text{millivolts}_{(0\text{-}pk)}$ for ions having a mass within a range between about 50 Da to about 500 Da; in a range between about 100 $\text{millivolts}_{(0\text{-}pk)}$ to about 700 $\text{millivolts}_{(0\text{-}pk)}$ for ions having a mass within a range between about 500 Da to about 5000 Da; etc. The excitation time interval can be varied inversely with the auxiliary alternating potential.

The motion of a particular ion is controlled by the Mathieu parameters a and q of the mass analyzer. For positive ions, these parameters are related to the characteristics of the potential applied from terminals to ground as follows:

$$a_x = -a_y = a = \frac{8eU}{m_{ion}\Omega^2 r_0^2}$$

and $$q_x = -q_y = q = \frac{4\text{ eV}}{m_{ion}\Omega^2 r_0^2}$$

where e is the charge on an ion, $m_{ion}$ is the ion mass, $\Omega=2\pi f$ where f is the RF frequency, U is the DC voltage from a pole to ground and V is the zero to peak RF voltage from each pole to ground. If the potentials are applied with different voltages between pole pairs and ground, U and V are ½ of the DC potential and the zero to peak AC potential respectively between the rod pairs. Combinations of a and q that give stable ion motion in both the x and y directions are usually shown on a stability diagram.

In various embodiments, methods are provided for increasing the retention of low-mass fragments of the parent ion after termination of the excitation potential. In various embodiments, after termination of the excitation potential, the q value of the trapping alternating potential (trapping RF) is lowered. The reduction of the q of the RF trapping potential can be reduced to allow the remaining hot (excited) parent ions to continue dissociating, and to retain more of the low-mass fragments. A reduction of the Mathieu stability q parameter can be accomplished by reducing the RF trapping potential amplitude and/or increasing the angular frequency of the RF trapping potential. In various embodiments, these methods facilitate extending the mass range of the fragmentation spectrum towards lower mass values. In various embodiments, q is reduced by at least 10% and sometimes by at least 30% or 60%.

In various embodiments, methods of the present invention can increase the range of ion fragment masses retained in the ion trap by reducing the value of q after initial excitation of the parent ion. For example, a parent ion can be excited initially with a q value of $q_{exc}$ followed by a reduction in q to a value of $q_h$. The value $q_h$ can be determined experimentally as the high-mass cut-off value of q for the parent ion, i.e. the lowest value of q that may be used and still retain the parent ion in the trap. The lowering of the q value results in a percentage increase Δ% of the range of ion fragment masses retained in the ion trap by the amount $$\Delta\ \% = 100 \times \frac{(q_{exc} - q_h)}{(0.908 - q_{exc})} \quad (2)$$

where the percentage increase is expressed in relation to the initial range of ion fragment masses retained in the trap, i.e. m−LMCO.

In accordance with an aspect of an embodiment of the present invention, there is provided a method for fragmenting ions in an ion trap of a mass spectrometer comprising a) selecting parent ions for fragmentation; b) retaining the parent ions within the ion trap for a retention time interval, the ion trap having an operating pressure of less than about $1\times10^{-4}$ Torr; c) providing a RF trapping voltage to the ion trap to provide a Mathieu stability parameter q at an excitement level during an excitement time interval within the retention time interval; d) providing a resonant excitation voltage to the ion trap during the excitement time interval to excite and fragment the parent ions; and, e) within the retention time interval and after the excitement time interval, terminating the resonant excitation voltage and changing the RF trapping voltage applied to the ion trap to reduce the Mathieu stability parameter q to a hold level less than the excitement level to retain fragments of the parent ions within the ion trap.

In some embodiments, the excitement time interval is i) between about 1 ms and about 150 ms in duration; ii) less than about 50 ms in duration; iii) greater than about 2 ms in duration; or iv) greater than about 10 ms in duration.

In some embodiments, the resonant excitation voltage has an amplitude of between i) about 50 mV and about 250 mV, zero to peak; or ii) about 50 mV and about 100 mV, zero to peak.

In some embodiments, the excitement level of q is between i) about 0.15 and about 0.9; or ii) about 0.15 and about 0.39.

In some embodiments, the hold level of q is above about 0.015.

In some embodiments, the excitement time interval is determined based at least partly on the operating pressure in the ion trap, such that the excitement time interval varies inversely with the operating pressure in the ion trap; and, an amplitude of the resonant excitation voltage is determined based at least partly on the operating pressure in the ion trap, such that the amplitude of the resonant excitation voltage varies inversely with the operating pressure in the ion trap.

In some embodiments, the hold level of q can be determined to be i) sufficiently high to retain the parent ions within the ion trap, and ii) sufficiently low to retain within the ion trap fragments of the parent ions having a fragment m/z less than about one fifth of a parent m/z of the parent ions.

In some embodiments in which the excitement time interval is greater than about 10 ms, the resonant excitation voltage has an amplitude of between about 50 mV and about 100 mV, zero to peak.

In some embodiments in which the excitement time interval is between about 1 ms and about 150 ms in duration, the resonant excitation voltage has an amplitude of between about 50 mV and about 700 mV, zero to peak.

In some embodiments in which the excitement time interval is between about 1 ms and about 150 ms in duration, the resonant excitation voltage is terminated substantially concurrently with the RF trapping voltage applied to the ion trap being changed to reduce the Mathieu stability parameter q to the hold level.

In some embodiments in which the excitement time interval is between about 1 ms and about 150 ms in duration, the ion trap has an operating pressure of less than about $5\times10^{-5}$ Torr during the retention time.

In some embodiments in which the excitement time interval is between about 1 ms and about 150 ms in duration, the hold level of q is at least about ten percent less than the excitement level of q.

Experiments were performed using a modified version of an API 4000 Q TRAP mass spectrometer (Applied Biosystems/MDS SCIEX, Canada). The ion path was based on that of a triple quadrupole mass spectrometer with the last quadrupole rod array (Q3) configured to operate either as a conventional RF/DCmass filter or as a linear ion trap (LIT).

Ion activation was achieved via resonance excitation with a single frequency dipolar auxiliary signal applied between two opposing rods. The frequency of excitation was determined by the main RF field. Experiments were done at a frequency of excitation corresponding to a stability parameter for the precursor ion of Mathieu parameter q=0.236.

The pressure in the LIT was between 0.02 and 0.05 mTorr. It was observed that reducing the fragmentation times from 100 ms to 20 ms and reducing the main RF voltage right after that, during the parent ion dissociation, allowed the collection of fragment ions of mass-to-charge ratio lower than the low mass cut off.

These and other features of the Applicant's teachings are set forth herein.

BRIEF DESCRIPTION OF THE DRAWINGS

The skilled person in the art will understand that the drawings, described below, are for illustration purposes only. The drawings are not intended to limit the scope of the applicant's teachings in any way.

DESCRIPTION OF VARIOUS EMBODIMENTS OF THE INVENTION

Prior to further describing various embodiments of the present teachings it may be useful to an understanding thereof to describe the use of various terms used herein and in the art.

One term relevant to the ion fragmentation process is "fragmentation efficiency", which can be defined as a measure of the amount of parent molecules that are converted into fragments. A fragmentation efficiency of 100% means that all parent molecules have been broken into one or more constituent parts. Additional relevant terms include the speed at which the fragments can be produced, and the speed at which they can be made available for subsequent ion processing.

A variety of ion traps are known, of which one type of ion trap is the linear ion trap comprising a RF multipole for radial confinement of the ions and often end electrodes for axial confinement of ions. A RF multipole comprises an even number of elongate electrodes commonly referred to as rods, which are also referred to as radial confinement electrodes herein to distinguish them from end electrodes often found in linear ion traps. A RF multipole with four rods is called a quadrupole, one with six a hexapole, with eight an octopole, etc. The cross-sections of these electrodes (although commonly called rods) are not necessarily circular. For example, hyperbolic cross-section electrodes (electrodes where opposing faces have a hyperbolic shape) can also be used. See, e.g., "Prediction of quadrupole mass filter performance for hyperbolic and circular cross section electrodes" by John Raymond Gibson and Stephen Taylor, Rapid Communications in Mass Spectrometry, Vol. 14, Issue 18, Pages 1669-1673 (2000). In various embodiments, a RF multipole can be used to trap, filter, and/or guide ions by application of a DC and AC potential to the rods of the multipole. The AC component of the electrical potential is often called the RF component, and can be described by the amplitude and the oscillatory frequency. More than one RF component can be applied to an RF multipole. In various embodiments of an ion trap, a trapping RF component is applied to radially confine ions within the multipole for a retention time interval and an auxiliary RF component, applied across two or more opposing rods of the multipole for an ion excitation time interval, can be used to impart translational energy to the ions.

In the description that follows, voltage amplitudes represent the zero to peak potentials. For example, a sinusoidal-type alternating potential, alternating between +5 volts and −5 volts applied across to poles would be said to have a 5 volt amplitude.

Figure 1A:
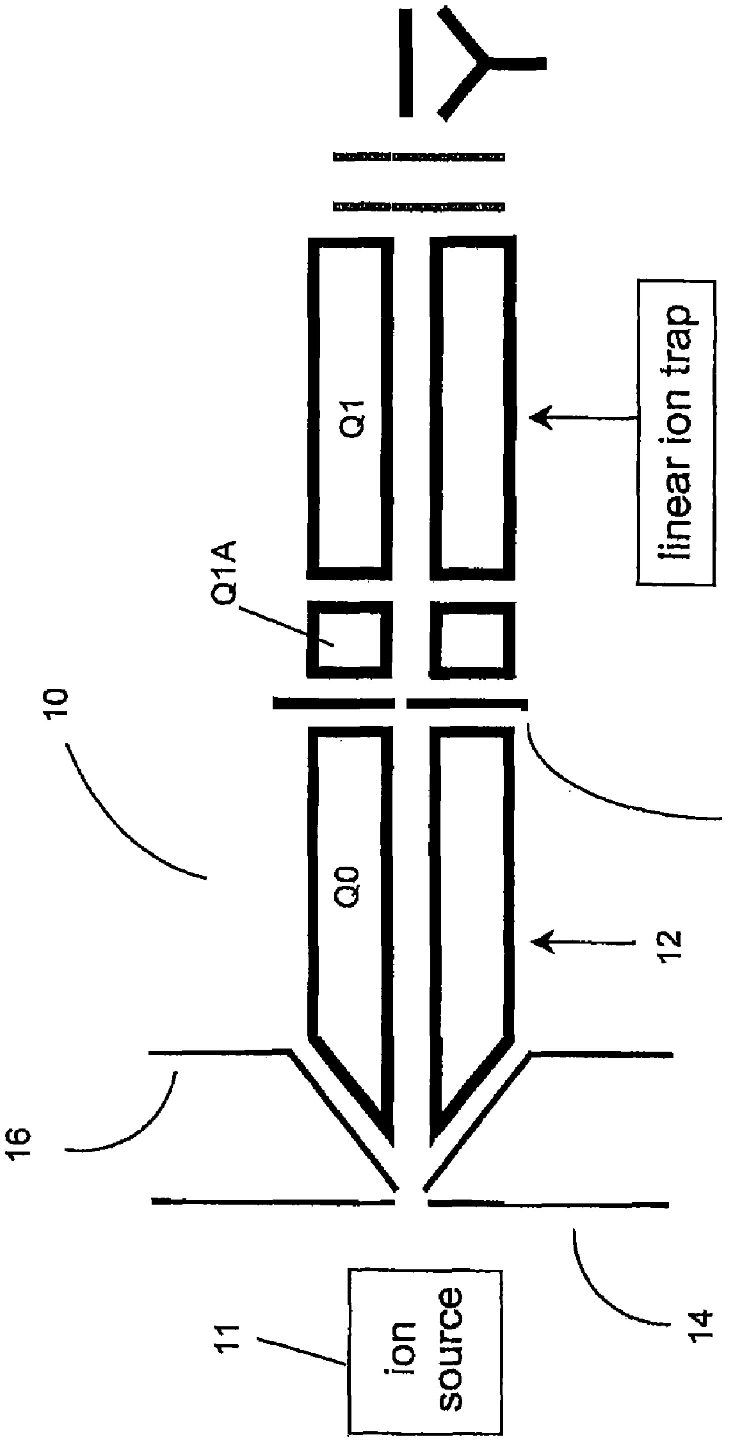
FIG. 1*a*, in a schematic diagram, illustrates a Q-trap linear ion trap mass spectrometer.

Referring to FIG. 1*a*, there is illustrated in a schematic diagram a particular variant of a q-trap ion trap mass spectrometer as described, for example, in U.S. Pat. No. 6,504,148, and by Hager and Le Blanc in rapid communications of mass spectrometry, 2003, 17, 1056-1064, and that is suitable for use for implementing a method in accordance with an aspect of the present invention. It will also be appreciated by others skilled in the art that different mass spectrometers may be used to implement methods in accordance with different aspects of the present invention.

During operation of the mass spectrometer, ions are admitted into a vacuum chamber 12 through an orifice plate 14 and skimmer 15. Any suitable ion source 11, such as, for example, MALDI, NANOSPRAY or ESI, can be used. The mass spectrometer system 10 comprises two elongated sets of rods Q0 and Q1. These sets of rods may be quadrupoles (that is, they may have four rods) hexapoles, octopoles, or have some other suitable multipole configurations. Orifice plate IQ1 is provided between rods set Q0 and Q1. In some cases fringing fields between neighboring pairs of rod sets may distort the flow of ions. Stubby rods Q1*a* can help to focus the flow of ions into the elongated rod set Q1.

In the system shown in FIG. 1*a*, ions can be collisionally cooled in Q0, while Q1 operates as a linear ion trap. Typically, ions can be trapped in linear ion traps by applying RF voltages to the rods, and suitable trapping voltages to the end aperture lens. Of course, no actual voltages need be provided to the end lens themselves, provided an offset voltage is applied to Q1 to provide the voltage difference to axially trap the ions.

Figure 1B:
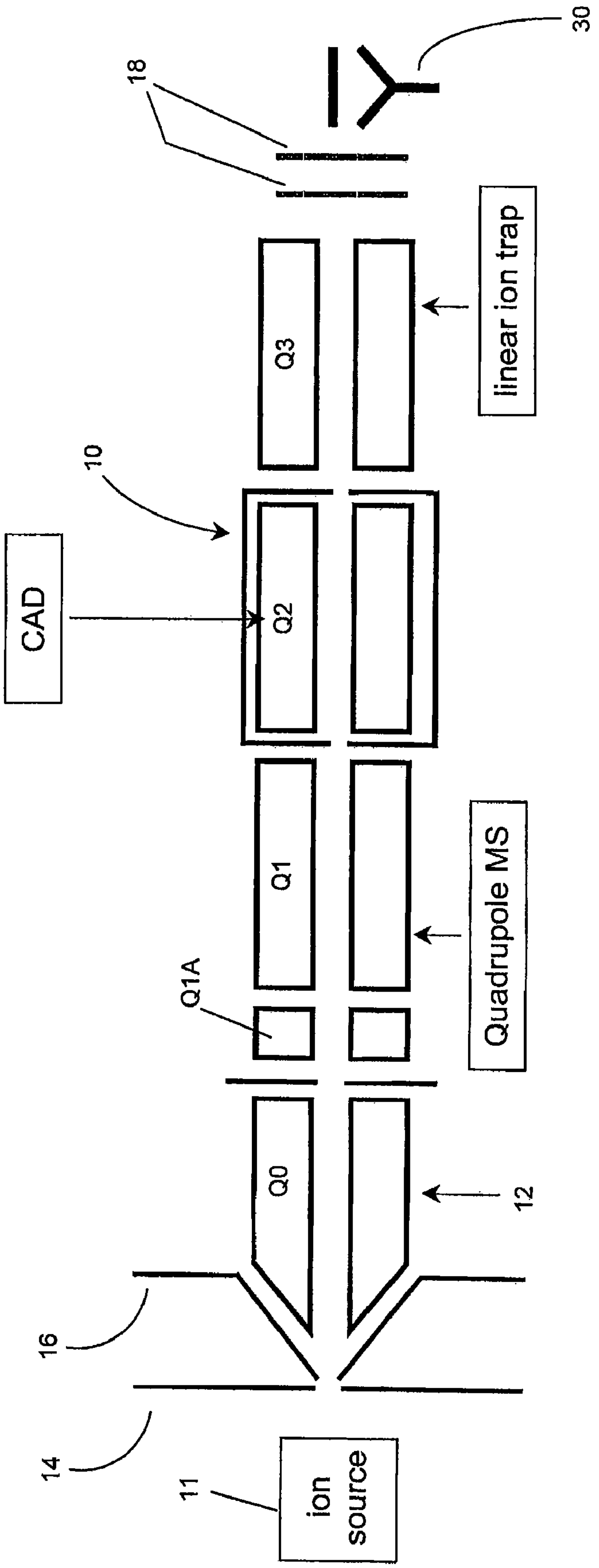
FIG. 1*b*, in a schematic diagram, illustrates a Q-trap Q-q-Q linear ion trap mass spectrometer.

Referring to FIG. 1*b*, there is illustrated in a schematic diagram a Q-q-Q ion trap mass spectrometer. Either of the mass spectrometer systems 10 of FIG. 1*a* or FIG. 1*b* can be used to implement methods in accordance with different aspects of the present invention. For clarity, the same reference numerals are used to designate like elements of the mass spectrometer systems 10 of FIG. 1*a* and FIG. 1*b*. For brevity, the description of FIG. 1*a* is not repeated with respect to FIG. 1*b*.

In the configuration of the linear ion trap mass spectrometer system 10 of FIG. 1*b*, Q1 operates as a conventional transmission RF/DC quadrupole mass spectrometer, and Q3 operates as a linear ion trap. Q2 is a collision cell in which ions collide with a collision gas to be fragmented into products of lesser mass. In some cases, Q2 can also be used as a reaction cell in which ion-neutral or ion-ion reactions occur to generate other types of fragments or adducts.

In operation, after a group of precursor ions are admitted to Q0, and cooled therein, a particular precursor or parent ion of interest can be selected for in Q1, and transmitted to Q2. In the collision cell Q2, this parent or precursor of interest could, for example, be fragmented to produce a fragment of interest, which is then ejected from Q2 to linear ion trap Q3. Within Q3, this fragment of interest from Q2, can become the parent of interest in subsequent mass analysis conducted in Q3, as described in more detail below.

Figure 2A:
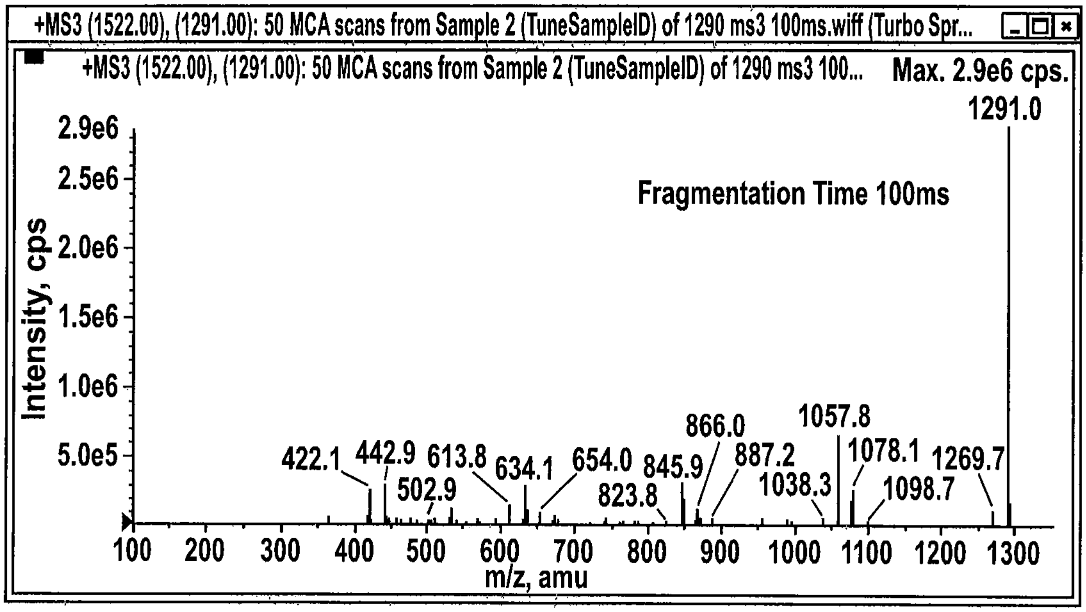
FIG. 2*a*, in a graph, illustrates a spectrum for a 1290 Da parent ion obtained using the linear ion trap mass spectrometer system of FIG. 1*b*, a fragmentation or excitation time interval of 100 ms, and a resonant excitation voltage amplitude of 50 mV, zero-to-peak.
Figure 2B:
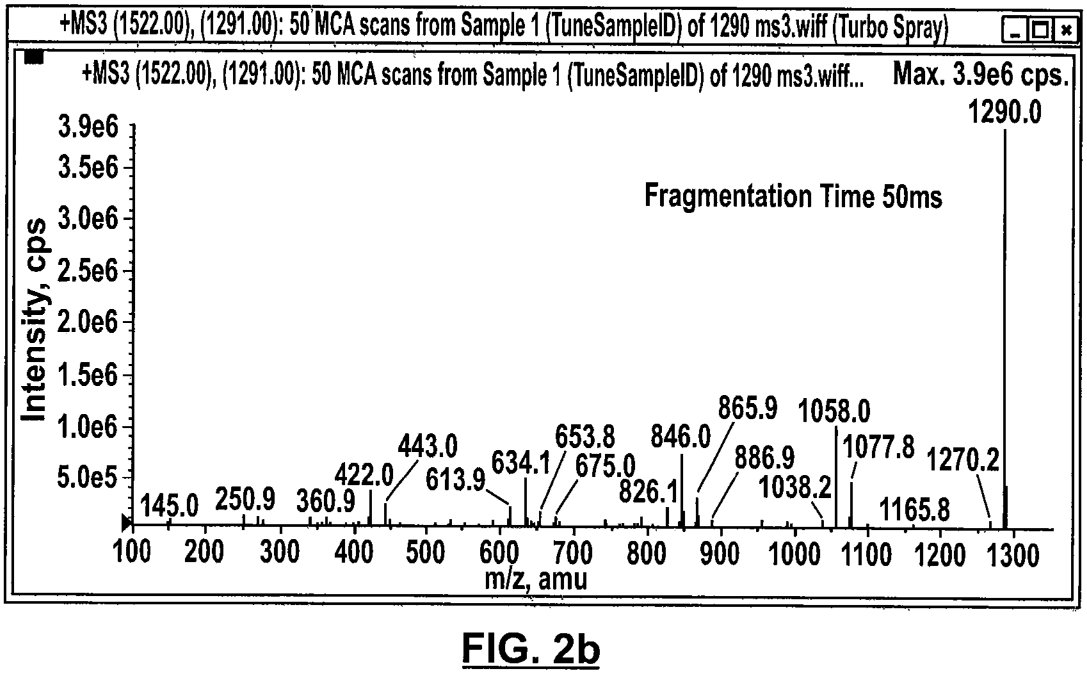
FIG. 2*b*, in a graph, illustrates a spectrum obtained for a 1290 Da parent ion using the linear ion trap mass spectrometer system of FIG. 1*b*, a fragmentation or excitation time interval of 50 ms, and a resonant excitation voltage amplitude of 50 mV, zero-to-peak.

Referring to FIGS. 2_a_ and 2_b_, fragmentation spectra of a parent ion having a mass of 1290 Da are illustrated. The fragmentation spectra are generated by the linear ion tarp Q3 of FIG. 1_b_. The parent ion analyzed in Q3, could be obtained by selecting for suitable precursor ions in Q1, and then fragmenting these precursor ions in Q2 to provide the parent ion of mass 1290 Da, among other ions. This parent ion of mass 1290 Da could then be transmitted to Q3. As shown on the graphs, different fragmentation times but the same excitation voltage, 50 $mV_{0\text{-}p}$ were used. As marked on the graphs, the fragmentation time or excitation time interval for the mass spectrum for FIG. 2_a_ was 100 milliseconds, and the fragmentation time or excitation time interval for the spectrum of FIG. 2_b_ was 50 milliseconds. In both cases, the pressure in Q3 was approximately $3.5\times10^{-5}$ Torr. To obtain the spectra of both FIGS. 2_a_ and 2_b_, one value of q was used: 0.236. Generally, ions become unstable at q values of over 0.907. The lower mass cut off for both spectra is approximately 26% of the mass of the parent ion, or about 335 Da, which is typical of much of the art. The spectrum of FIG. 2_b_ includes no apparent peaks below this mass threshold. The spectrum of FIG. 2_b_ shows only very small peaks around or below the lower mass cut off of 335 Da.

Figure 3A:
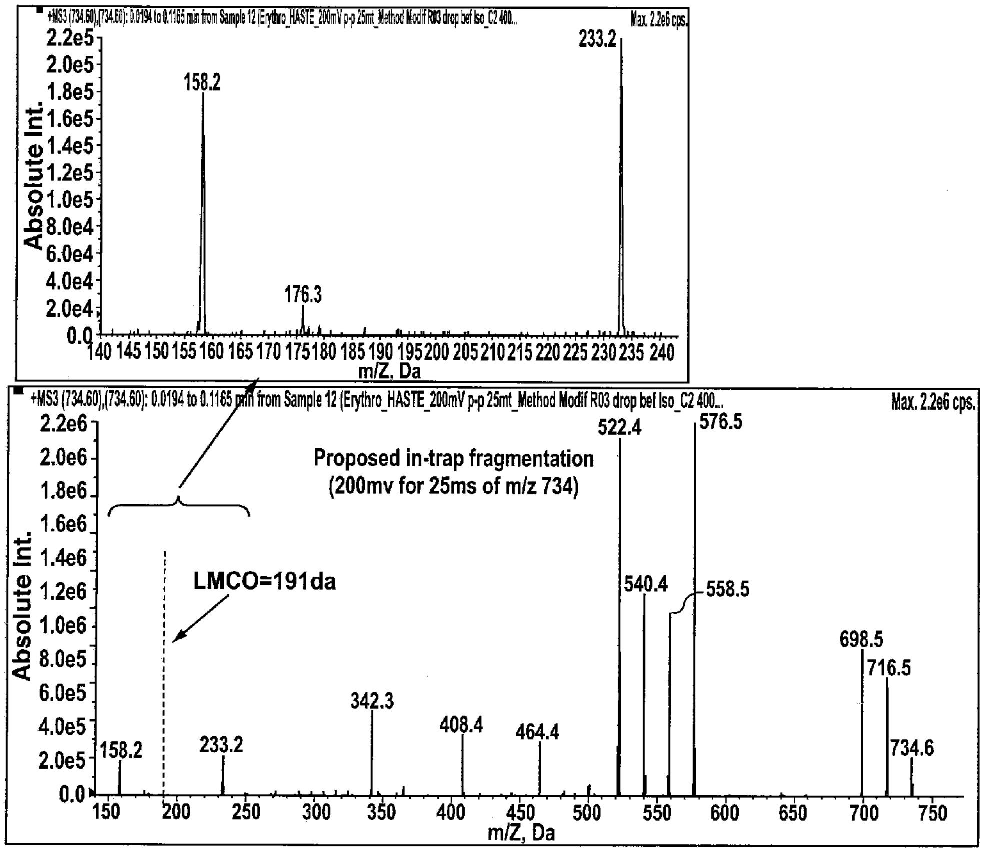
FIG. 3*a*, in a graph, illustrates a spectrum for a 734 Da parent ion obtained using the linear ion trap mass spectrometer system of FIG. 1*b*, a fragmentation or excitation time interval of 25 ms, and a resonant excitation voltage amplitude of 100 mV, zero-to-peak.
Figure 3B:
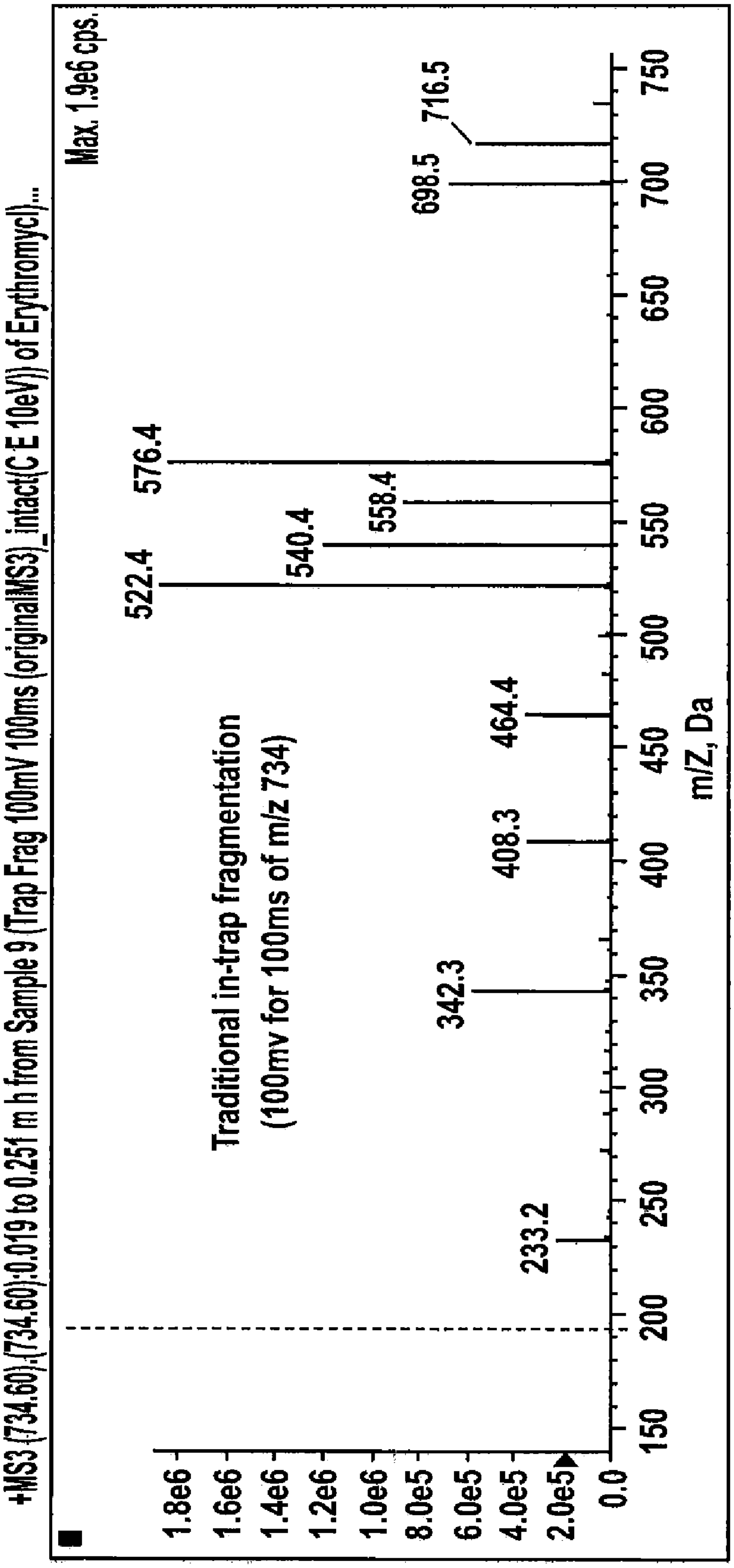
FIG. 3*b*, in a graph, illustrates a spectrum for a 734 Da parent ion obtained using the linear ion trap mass spectrometer system of FIG. 1*b*, a fragmentation or excitation time interval of 100 ms, and a resonant excitation voltage amplitude of 50 mV, zero-to-peak.

Referring to FIGS. 3_a_ and 3_b_, spectra obtained for an ion of m/z of 734 Da are illustrated. Similar to the mass spectra of FIGS. 2_a_ and 2_b_, the mass spectra of FIGS. 3_a_ and 3_b_ were generated using Q3 of the mass spectrometer system 10 of FIG. 1_b_. In this case, Q3 was operated at a pressure of $4.5\times10^{-5}$. In the case of the spectrum of FIG. 3_a_, q was initially held at an excitement level of 0.236, before being dropped to a hold level of 0.16. More specifically, q was held at the level of 0.236 for 25 ms during fragmentation, after which q was dropped to 0.16. During fragmentation, the resonant excitation voltage amplitude was 100 mV.

The spectrum of FIG. 3_b_ was generated by providing 50 mV resonant excitation voltage amplitude to Q3 for a fragmentation time of 100 ms. Similar to the spectrum of FIG. 3_a_, to provide the spectrum of FIG. 3_b_, the value of q was dropped from an initial value of 0.236 during this fragmentation time to a hold value of q of 0.16.

Comparison of the spectra of FIGS. 3_a_ and 3_b_ makes it clear that significant gains in the lower mass cut off can be obtained by decreasing the fragmentation time and reducing q after this fragmentation time to help retain ions of low mass. Thus, in the spectrum of FIG. 3_a_, there is a significant peak at 158.2 Da, which is well below 191 Da or 26% of 735 Da. In contrast, where q is maintained at the higher level of 0.236 for a longer excitation time interval of 100 milliseconds, there are no significant peaks below the 191 Da threshold. Thus, significant gains can be obtained by cutting the fragmentation time or excitation time interval, and dropping q after this fragmentation time. Any reduction in the fragmentation efficiency resulting from this drop in the fragmentation time can to some extent be compensated for by increasing the resonant excitation voltage amplitude. That is, comparing the mass spectra of FIGS. 3_a_ and 3_b_, the peaks are largely the same above the threshold of 191 Da, a difference being that below the threshold of 191 Da, a peak is shown in the spectrum of FIG. 3_a_, but not in that of FIG. 3_b_.

Figure 4:
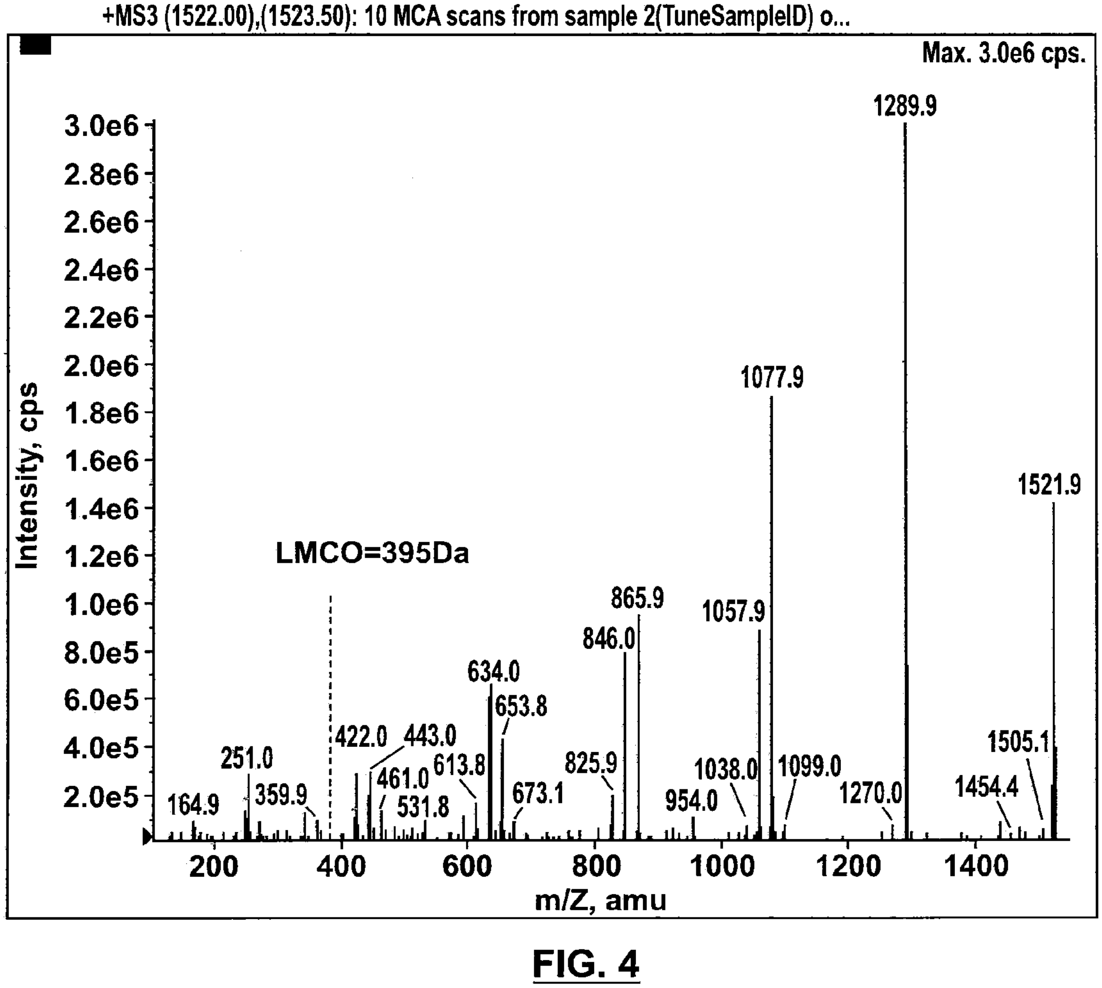
FIG. 4, in a graph, illustrates a spectrum for a 1522 Da parent ion obtained using the linear ion trap mass spectrometer system of FIG. 1*b*, a fragmentation or excitation time interval of 100 ms, and a resonant excitation voltage amplitude of 75 mV, zero-to-peak.

While the spectra of FIGS. 3_a_ and 3_b_ seem to indicate that shorter fragmentation times can be advantageous in allowing ions of lower mass to be retained, longer fragmentation times may still be suitable for tough parent ions that are relatively difficult to fragment. Referring to FIG. 4 there is illustrated in a graph, a spectrum obtained for a parent ion of m/z equal to 1522 Da. Similar to the spectra discussed above in connection with FIGS. 2_a_, 2_b_, 3_a_ and 3_b_, the parent ion of FIG. 4 can be obtained by initially selecting suitable precursor ions in Q1 of the system of FIG. 1_b_, fragmenting these selected precursor ions in Q2, and then conducting further analysis of one of the fragments of these precursor ions, the 1522 Da ion, in Q3. To produce the spectrum of FIG. 4, Q3 was operated at a pressure of $3.5\times10^{-5}$ Torr. The fragmentation time was 100 milliseconds and the amplitude of the resonant excitation voltage was 75 mV. Q was kept at an excitement level of 0.236 during the fragmentation time, and then dropped to a hold level of 0.08. In this case, the lower mass cut off typical of much of the art would be 395 Da, which lower mass cut off is marked on the graph of FIG. 4.

As shown in FIG. 4, this spectrum includes peaks well below the typical lower mass cut off threshold of 395 Da. Perhaps the most significant peak occurs at 251 Da.

Figure 5:
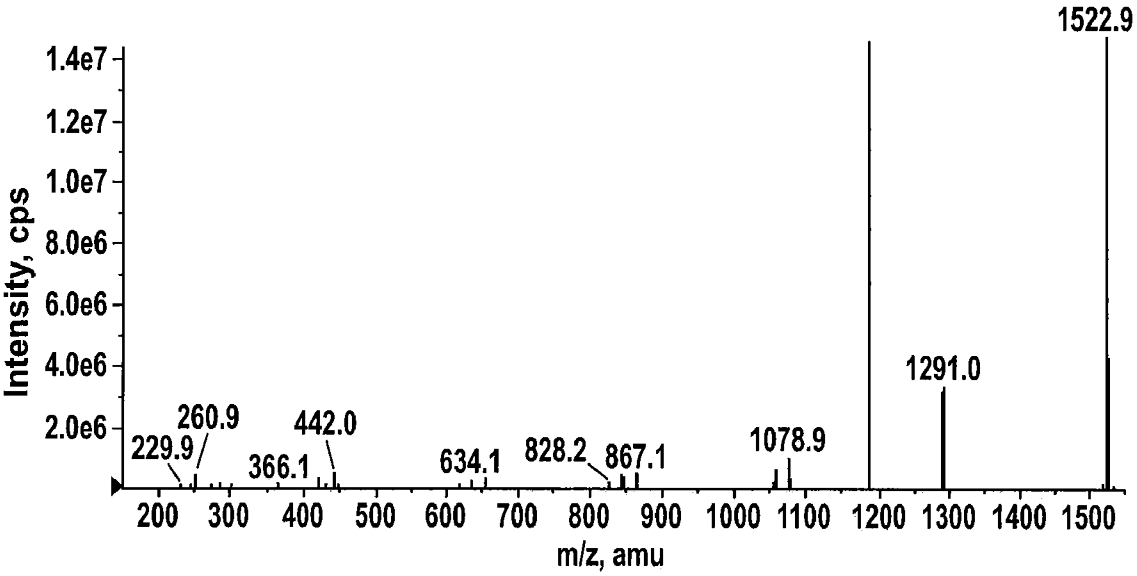
FIG. 5, in a graph, illustrates a spectrum for a 1522 Da parent ion obtained using the linear ion trap mass spectrometer system of FIG. 1*b*, a fragmentation or excitation time interval of 20 ms, and a resonant excitation voltage amplitude of 400 mV, zero-to-peak.

In addition to longer fragmentation times being suitable for tough parent ions that are relatively difficult to fragment, higher resonant excitation voltages may also be used to advantage. Referring to FIG. 5 there is illustrated in a graph, a spectrum obtained for a parent ion of m/z equal to 1522 Da. Similar to the spectra discussed above, the parent ion of FIG. 5 can be obtained by initially selecting suitable precursor ions in Q1 of the system of FIG. 1_b_, fragmenting these selected precursor ions in Q2, and then conducting further analysis of one of the fragments of these precursor ions, the 1522 Da ion, in Q3. To produce the spectrum of FIG. 5, Q3 was operated at a pressure of $4.7\times10^{-5}$ Torr. The fragmentation time was 20 milliseconds and the amplitude of the resonant excitation voltage was 400 mV. Q was kept at an excitement level of 0.4 during the fragmentation time, and then dropped to a hold level of 0.083. In this case, given the relatively high resonant excitation voltage and the value for q, the lower mass cut off typical of much of the art would be 672 Da, which lower mass cut off is marked on the graph of FIG. 5. As shown, the spectrum of FIG. 5 includes peaks well below the typical lower mass cut off threshold of 672 Da.

Figure 6:
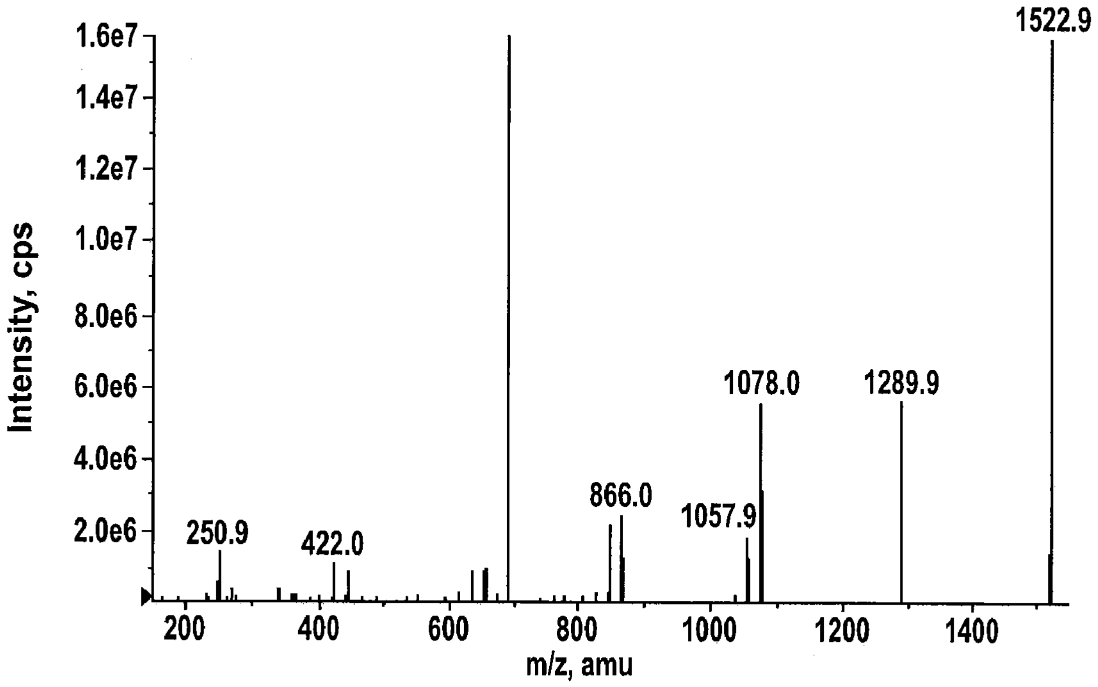
FIG. 6, in a graph, illustrates a spectrum for a 1522 Da parent ion obtained using the linear ion trap mass spectrometer system of FIG. 1*b*, a fragmentation or excitation time interval of 10 ms, and a resonant excitation voltage amplitude of 700 mV, zero-to-peak.

Still larger resonant excitation voltage amplitudes may be used. Referring to FIG. 6 there is illustrated in a graph, a spectrum obtained for a parent ion of m/z equal to 1522 Da. Similar to the spectra discussed above, the parent ion of FIG. 6 can be obtained by initially selecting suitable precursor ions in Q1 of the system of FIG. 1_b_, fragmenting these selected precursor ions in Q2, and then conducting further analysis of one of the fragments of these precursor ions, the 1522 Da ion, in Q3. To produce the spectrum of FIG. 6, Q3 was operated at a pressure of $4.7\times10^{-5}$ Torr. The fragmentation time was 10 milliseconds and the amplitude of the resonant excitation voltage was 700 mV. Q was kept at an excitement level of 0.703 during the fragmentation time, and then dropped to a hold level of 0.083. In this case, given the relatively high resonant excitation voltage and value for q, the lower mass cut off typical of much of the art would be 1181 Da, which lower mass cut off is marked on the graph of FIG. 6. As shown, the spectrum of FIG. 6 includes peaks well below the typical lower mass cut off threshold of 1181 Da.

Other variations and modifications of the invention are possible. For example, many different linear ion trap mass spectrometer systems (in addition to those described above) could be used to implement methods in accordance with aspects of different embodiments of the present invention. In addition, all such modifications or variations are believed to be within the sphere and scope of the invention as defined by the claims appended hereto.

The invention claimed is:

1. A method for fragmenting ions in an ion trap of a mass spectrometer comprising a) selecting parent ions for fragmentation;

b) retaining the parent ions within the ion trap for a retention time interval, the ion trap having an operating pressure of less than about $1\times10^{-4}$ Torr;

c) providing a RF trapping voltage to the ion trap to provide a Mathieu stability parameter q at an excitement level during an excitement time interval within the retention time interval;

d) providing a resonant excitation voltage to the ion trap during the excitement time interval to excite and fragment the parent ions; and, e) within the retention time interval and after the excitement time interval, terminating the resonant excitation voltage and changing the RF trapping voltage applied to the ion trap to reduce the Mathieu stability parameter q to a hold level less than the excitement level to retain fragments of the parent ions within the ion trap.

2. The method as defined in claim 1 wherein the excitement time interval is between about 1 ms and about 150 ms in duration.

3. The method as defined in claim 2 wherein the excitement time interval is less than about 50 ms in duration.

4. The method as defined in claim 2 wherein the excitement time interval is greater than about 2 ms in duration.

5. The method as defined in claim 2 wherein the excitement time interval is greater than about 10 ms in duration.

6. The method as defined in claim 2 wherein the resonant excitation voltage has an amplitude of between about 50 mV and about 250 mV, peak to peak.

7. The method as defined in claim 2 wherein the resonant excitation voltage has an amplitude of between about 50 mV and about 100 mV, peak to peak.

8. The method as defined in claim 2 wherein the excitement level of q is between about 0.15 and about 0.9.

9. The method as defined in claim 2 wherein the hold level of q is above about 0.015.

10. The method as defined in claim 2 wherein c) comprises determining the excitement time interval based at least partly on the operating pressure in the ion trap, such that the excitement time interval varies inversely with the operating pressure in the ion trap; and, d) comprises determining an amplitude of the resonant excitation voltage based at least partly on the operating pressure in the ion trap, such that the amplitude of the resonant excitation voltage varies inversely with the operating pressure in the ion trap.

11. The method as defined in claim 2 wherein e) comprises determining the hold level of q to be i) sufficiently high to retain the parent ions within the ion trap, and ii) sufficiently low to retain within the ion trap fragments of the parent ions having a fragment m/z less than about one fifth of a parent m/z of the parent ions.

12. The method as defined in claim 2 wherein the excitement level of q is between about 0.15 and about 0.39.

13. The method as defined in claim 12 wherein the excitement time interval is greater than about 10 ms.

14. The method as defined in claim 13 wherein the resonant excitation voltage has an amplitude of between about 50 mV and about 100 mV, peak to peak.

15. The method as defined in claim 2 wherein the resonant excitation voltage has an amplitude of between about 50 mV and about 700 mV, peak to peak.

16. The method as defined in claim 2 wherein the resonant excitation voltage is terminated substantially concurrently with the RF trapping voltage applied to the ion trap being changed to reduce the Mathieu stability parameter q to the hold level.

17. The method as defined in claim 2 wherein, in b), the ion trap has an operating pressure of less than about $5\times10^{-5}$ Torr.

18. The method as defined in claim 2 wherein the hold level of q is at least about ten percent less than the excitement level of q.

* * * * *